Sept. 21, 1954        L. E. LEMMON        2,689,543
MOTOR VEHICLE HORN GUARD
Filed April 22, 1952
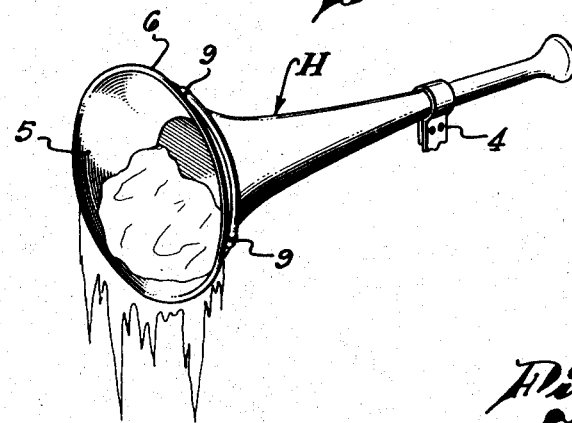
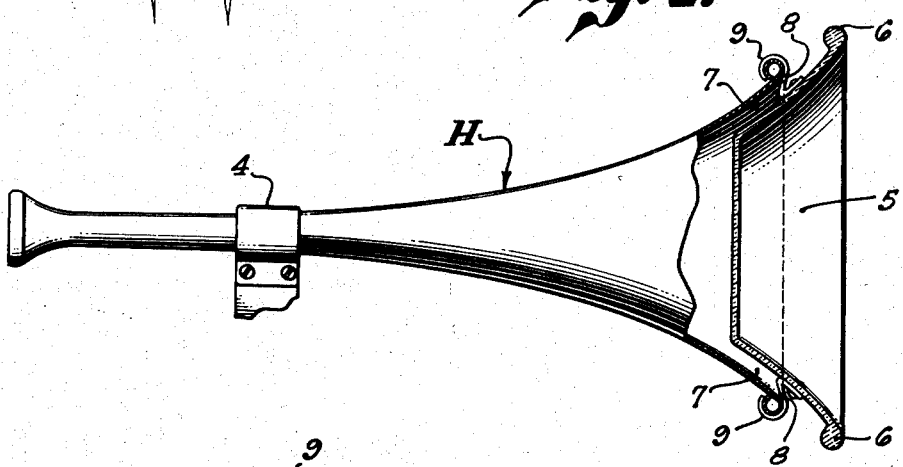
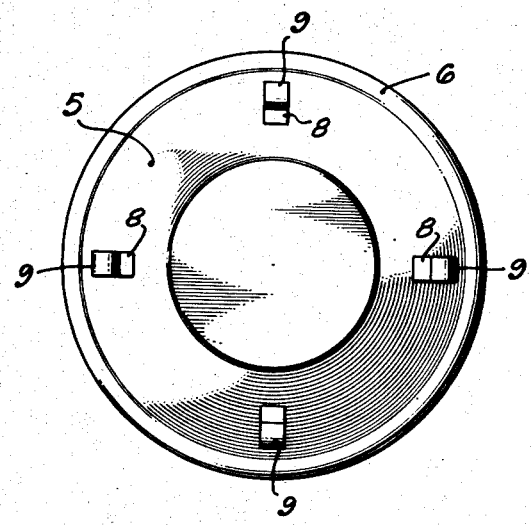
LOUIS E. LEMMON,
INVENTOR.
BY
ATTORNEY.

Patented Sept. 21, 1954

2,689,543

UNITED STATES PATENT OFFICE 2,689,543

MOTOR VEHICLE HORN GUARD

Louis E. Lemmon, Wilmington, Calif.

Application April 22, 1952, Serial No. 283,705

1 Claim. (Cl. 116—137)

This invention relates to motor vehicle horn guards, and more particularly to a guard adapted to be placed in the open mouth of a vehicle horn, such as is used on motor trucks and other motor vehicles, to prevent the entrance of snow, rain and other matter which would interfere with the true function of said horn.

It is not uncommon, on long trips in stormy weather, for these motor horns to be filled with snow and ice and to be disabled to such an extent that they are useless.

Among the salient objects of the present invention are: To provide a guard which is adapted to fit into the open, large end of a horn so as to prevent the entrance of rain, snow or other matter which interferes with the use of the horn, and which guard is so mounted and held in place that there is clearance space around the guard and the inside of said horn for the sound which emanates therefrom.

Another object of the invention is to provide a simple and practical guard member with means for easily mounting it in the mouth of the horn and for holding it in proper relationship therein.

In order to fully explain my invention, I have shown on the accompanying sheet of drawings one practical embodiment thereof, which I will now describe:

Figure 1 is a perspective view of a horn, with snow indicated therein;

Figure 2 is a side elevation thereof, partly in section, to show the guard in place, also in section; and Figure 3 is a rear or inner view of the guard removed.

The horn, designated H, can be of any type desired and such as are used on motor trucks and vehicles of all kinds, with means 4 for securing them in place on the vehicle, with the open end of the horn in the direction of movement of the vehicle.

The guard, as here shown, consists of a dish-like member 5, having a flare similar to the flare of the horn, and which fits into the open end of the horn, as shown, and which is held in place so as to provide a uniform annular space 7 between the guard and the horn.

I have shown an attaching clip, as 8, secured to the guard and having its free end in the form of a spring hook 9, capable of hooking over the rim of the horn, as indicated, whereby to hold said guard in place thereon, substantially in the manner illustrated in Fig. 2 of the drawings. It will be noted that with the guard in place in the mouth of the horn, nothing can enter the horn proper, and yet the sound therefrom can escape through the space between the guard and the inside of the horn. By preventing the entrance of rain, snow, and ice, and other matter such as dust and dirt, the life and efficiency of the horn is greatly increased.

The guard is held in place by four spring clips, as shown, and can be easily removed, if desired at any time to do so.

I do not limit my invention to the exact details of a guard as shown for illustrative purposes, except as I may be limited by the hereto appended claim.

I claim:

The combination with a motor vehicle horn having its larger open end in the direction of travel, of a guard of open dish-like form and having a closed bottom and a flare corresponding to the flare of the horn, said guard fitting inwardly into the mouth of the horn and leaving an annular space around said guard and within the horn for the outflow of sound between the guard and the horn, the flare of the guard being greater in outer diameter than the flare of the horn, whereby the open end of the horn is covered against inflow of rain or snow, and means for detachably holding said guard in the open end of the horn.

References Cited in the file of this patent

UNITED STATES PATENTS

| Number | Name | Date |
|---|---|---|
| 867,836 | Revell | Oct. 8, 1907 |
| 1,294,296 | Monteleone | Feb. 11, 1919 |
| 1,847,754 | Critchfield | Mar. 1, 1932 |
| 2,073,667 | Williams | Mar. 16, 1937 |
| 2,299,447 | Wood | Oct. 20, 1942 |